F. Deluce.

Centering Implement.

Nº 34,412.    Patented Feb. 18, 1862.

Witnesses:
J. B. Crosby
Geo. G. Ray

Inventor:
Francis Deluce

UNITED STATES PATENT OFFICE.

FRANCIS DELUCE, OF BOSTON, MASSACHUSETTS.

IMPROVED CENTERING IMPLEMENT.

Specification forming part of Letters Patent No. 34,412, dated February 18, 1862.

*To all whom it may concern:*

Be it known that I, FRANCIS DELUCE, of Boston, in the county of Suffolk and State of Massachusetts, have invented a new and Improved Centering Implement; and I do hereby declare that the following specification, taken in connection with the drawings which accompany and form a part of thereof, is a description of my said invention so full and exact as to enable those skilled in the art to practice it.

The object of my invention is to center cylindrical pieces of any suitable material, such pieces having square ends or ends at right angles to the axes of such pieces or prismatic pieces, with facility, speed, and practical accuracy to prepare such pieces for the lathe or other mechanism, wherein it is requisite for the said pieces to run upon centers or pivots.

The nature of my invention consists in providing a chuck which carries the drill or instrument which forms or cuts the center hole with a concave or conical guide which envelops the drill and is capable of yielding or sliding back upon or over the drill, so as to expose the cutting part thereof to permit it to perform its function, the purpose of said concave or conical piece being the automatic adjustment of the cylindrical or of the prismatic piece to be operated upon, so that its axis will be practically a continuation of the axial line of the drill.

Figure 2:
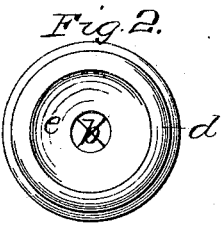
Figure 1:
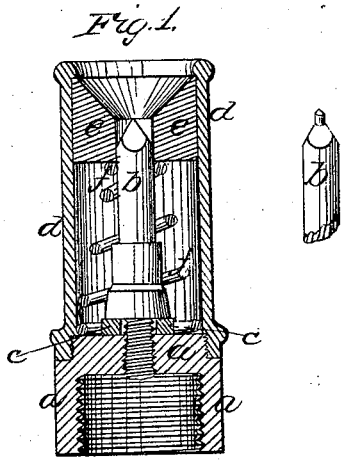

Figure 1 of the drawings is a vertical longitudinal section of one of the implements embodying my invention, and Fig. 2 is a plan of the same.

$a$ is a chuck fitted to be screwed or otherwise suitably secured to a lathe or to a drill-spindle. In the chuck a drill $b$ is secured, with a washer $c$ between the shoulder of the drill and the face of the chuck, or with some other suitable device affording facilities for increasing and diminishing the distance between the face of the chuck and the point of the drill with reference to the conical or concave piece $e$. The casing $d$, which is shown as fixed to the chuck so as to be capable of removal, I prefer should be made cylindrical, though it might be made polygonal. Within this casing the piece $e$ is fitted, so as to be capable of being longitudinally moved both against and by the spring $f$, which is placed within the space inclosed by the casing and surrounding the drill. As the piece $e$ should always rotate with the drill and the chuck to produce the best effect, it should, when the casing $d$ is not polygonal, be connected thereunto by a feather and spline or other equivalent means which will compel the rotation of one part with the other, while the piece $e$ is left so that it can be moved longitudinally in $d$.

The form of $e$ is best described by referring to the drawings. It is prevented from being displaced from the casing by a lip or flange projecting inward, against which $e$ is thrust by the spring. This spring may be spiral, volute, or of rubber, or of any other of the well-known forms of springs which may be applicable.

In using my invention the piece to be centered is thrust against the piece $e$, (usually by the action of the screw in the tail-stock of a lathe,) which by its rotation and its conical shape adjusts the piece centrally with its axis of rotation, while the pressure used forces $e$ back and permits the drill to operate as desired upon the piece pressed against $e$. Where the piece to be center-drilled is small it will of course enter farther into the conical cavity in $e$ than a piece of greater diameter. Therefore, when small pieces are to be center-drilled the length of the drill may be shortened by the removal of the washer $c$, or by whatever means for the adjustment of the length of the drill are employed. By having the drill adjustable in length pieces of large diameter do not require so much longitudinal movement to be given them as they otherwise might. Of course the drill may be so shaped as to form center holes of any desired shape.

I claim—

1. The implement for drilling center holes, constructed and operating substantially as set forth.

2. In combination with the said implement, the means described or the equivalent thereof for changing the relative position of the drill.

FRANCIS DELUCE.

Witnesses:
J. B. CROSBY,
G. G. RAY.